United States Patent [19]

Sabo Filho

[11] Patent Number: 5,582,412

[45] Date of Patent: Dec. 10, 1996

[54] CARTRIDGE TYPE WATER STOPPER

[75] Inventor: Jose Sabo Filho, San Paul, Brazil

[73] Assignee: Sabo Industria E Comercio LTDA., San Paul, Brazil

[21] Appl. No.: 54,813

[22] Filed: Apr. 27, 1993

[30] Foreign Application Priority Data

Apr. 30, 1992 [BR] Brazil .................................. 9205265

[51] Int. Cl.$^6$ ........................................ F16J 15/32
[52] U.S. Cl. .................. 277/37; 277/35; 277/153
[58] Field of Search .................. 277/37, 38, 152, 277/35, 153, 134, 58

[56] References Cited

U.S. PATENT DOCUMENTS

| | | | |
|---|---|---|---|
| 3,099,454 | 7/1963 | Walinski | 277/152 |
| 3,135,518 | 6/1964 | Carson et al. | 277/37 |
| 3,207,521 | 9/1965 | Dega | 277/37 |
| 3,214,180 | 10/1965 | Hudson et al. | 277/37 |
| 3,443,814 | 5/1969 | Dahlheimer | 277/152 |
| 4,126,320 | 11/1978 | Pendleton | 277/152 |
| 4,623,153 | 11/1986 | Nagasawa | 277/153 |
| 4,726,696 | 2/1988 | Dickinson | 277/152 |
| 4,936,591 | 6/1990 | Romero | 277/37 |
| 5,015,001 | 5/1991 | Jay | 277/37 |
| 5,269,536 | 12/1993 | Matsushima | 277/38 |

Primary Examiner—Daniel G. DePumpo
Attorney, Agent, or Firm—Anderson Kill & Olick P.C.

[57] ABSTRACT

A cartridge water gasket for use in an endothermal engine-powered water pump for isolating wet and dry sections of the pump, which includes an annular frame located in an annular space between the axle and the inner wall of the pump body, and having an external frame part fixed to the inner wall and an internal frame part secured on the axle for joint rotation therewith, and first and second sealing elements located in the frame cavity, secured to the external frame part, and having sealing surfaces sealingly engaging an inner surface of the internal frame part.

7 Claims, 1 Drawing Sheet

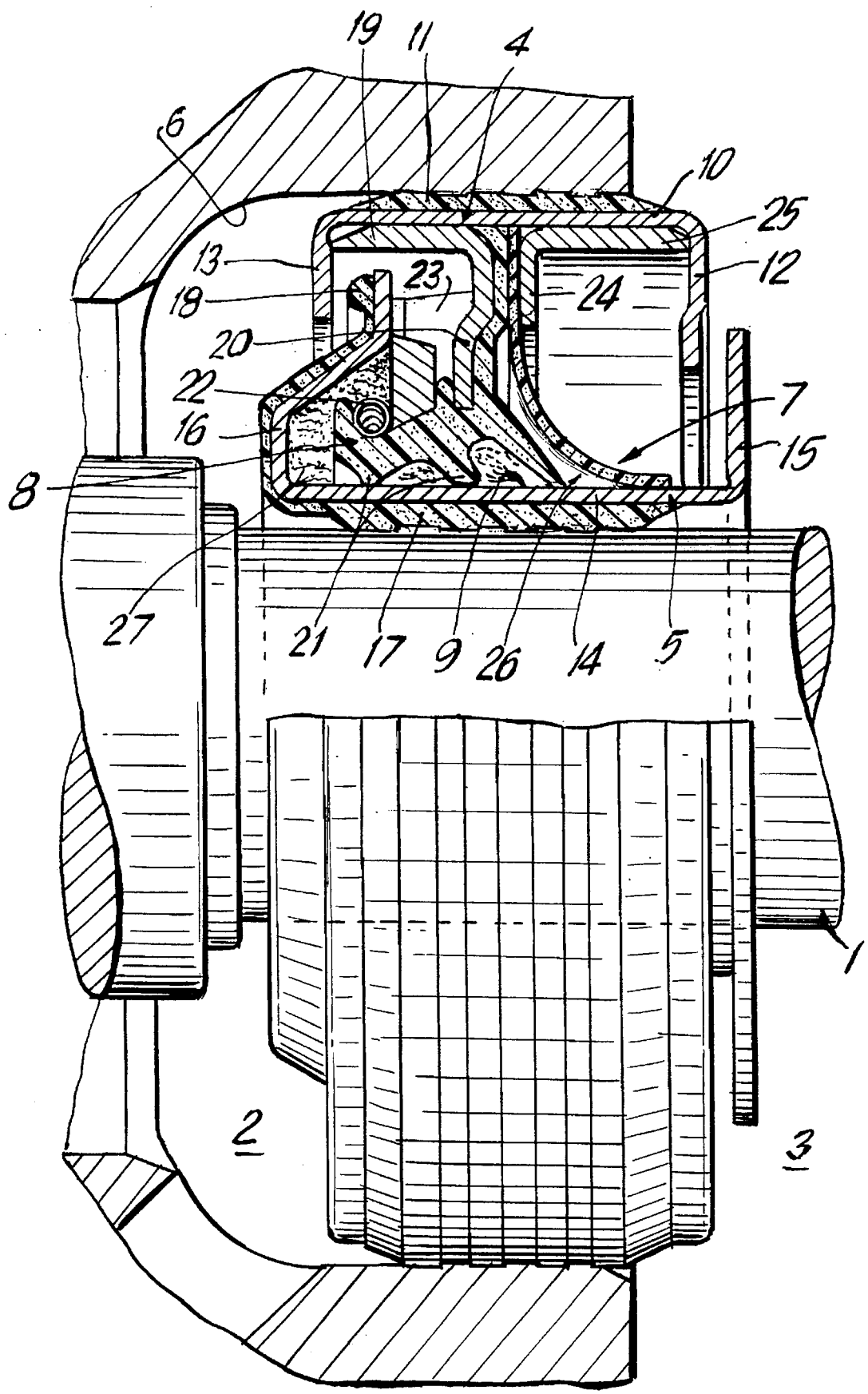

CARTRIDGE TYPE WATER STOPPER

BACKGROUND OF THE INVENTION

The present invention relates to a cartridge water seal and, in particular, a cartridge water seal for use in endothermal engine-powered water pumps.

At present, sealing of the axle of a water pump endothermic engine is effected with a so-called "facial" seal or with axial sealing, which is formed of a ceramic material and frictionally engages an associated element.

The operational conditions in which the sealing element operates is characterized by high operational temperatures, which are caused by the high speed of the axle which lies in a range of 2,000–8,000 revolutions per minute. Further, the pumped water may contain aggressive materials suspended therein. The high temperatures and the aggressive materials suspended in the pumped water reduces the sealing properties and the durability of the seals. A seal failure results in a failure of the engine, particularly when a large-sized engine is used.

Accordingly, an object of the invention is a cartridge water seal having improved sealing properties and a greater durability for use in endothermal engine-powered water pumps, in particular, for use in the increased size endothermal engine-powered water pumps.

SUMMARY OF THE INVENTION

The aforementioned and other objects of the invention, which will become apparent hereinafter, are achieved by providing a cartridge water seal, including an annular frame located in an annular space between the axle and the inner wall of the pump body, and having an external frame part fixed to the inner wall and an internal frame part secured on the axle for joint rotation therewith, with the external and internal frame parts having respective inner surfaces defining a cavity therebetween.

The inventive seal further includes first and second sealing elements located in the cavity of the annular frame and associated with the wet and dry sections of the pump, respectively. The first and second sealing elements are formed of a plastic material and an elastomeric material, respectively, and are secured to the external frame part. The first and second sealing elements have sealing surfaces sealingly engaging the inner surface of the internal frame part.

The external and internal frame parts are secured to the inner surface of the pump body and the axle, respectively, with elastomeric layers which are vulcanized on outer surfaces of the external and internal frame parts, and are compressed between the outer surfaces and the inner surface of the pump body and the outer surface of the axle, respectively.

The water seal, according to the invention, has a reduced wear as there is no friction between the parts of the seal and the pump, and the seal is able to withstand static, dynamic pressure and water turbulence.

BRIEF DESCRIPTION OF THE DRAWINGS

The features and objects of the present invention will become more apparent, and the invention itself will be best understood from the following detailed description of the invention, when read with reference to the accompanying drawing, wherein:

Single Figure shows a partial, partially cross-sectional view of an endothermal engine-powered water pump having a cartridge water seal according to the present invention.

DETAILED DESCRIPTION OF THE PREFERRED EMBODIMENT

A cartridge water seal according to the present invention is mounted on an axle 1 of the pump for insulating a dry section 2 of the pump from a wet section 3 thereof. The seal comprises an annular frame arranged in the annular space between the axle 1 and the inner wall 6 of the pump body. The annular frame is formed of two parts, namely, of a stationary external part 4, fixed to the inner wall 6, and a rotatable internal part 5 fixedly secured on the axle I for joint rotation therewith.

Both the external part 4 and the internal part 5 are made of a metal. Two sealing elements 7 and 8 are arranged in the cavity defined by the frame parts 4 and 5. The element 7, which is made of a plastic material, is located on a wet side of the pump assembly, and the element 8 which is made of an elastomeric material, is located on a dry side of the pump assembly. Both elements 7 and 8 are secured to the external frame part 4 and sealingly engage an axially extending inner surface of the internal part 5.

The external frame part 4 is formed as an inverted U-shaped ring. The frame part 4 has a tubular axially extending section 10 the external surface of which is covered with an elastomeric layer 11 vulcanized there- over. The elastomeric layer 11 is compressed between the tubular section 10 and the inner wall 6 with a controlled interference pressure. The tubular section 10 connects, and is formed integrally with two legs 12 and 13 which extend radially inward of the inner wall 6.

The leg or flange 12 has a shape slightly resembling a Z-profile and is located adjacent to the wet side of the pump assembly. The other leg or flange 13 is straight and is located on the dry side of the pump assembly.

The internal frame part 5 is also formed as an U-shaped ring having a tubular portion 14 and two legs or flanges 15 and 16 extending radially away relatively to the axle 1. The flange 15, which is located on the wet side of the pump assembly, is straight, whereas the flange 16 which is located on the dry side of the pump assembly, has a profile somewhat resembling a Z-profile.

The flange 15 of the internal frame part 5 is located externally of the flange 12 of the external frame part 4 with respect to the wet side of the pump assembly, with the free end of the flange 15 overlapping the free end of the flange 12. The flange 15 forms a closing element of the cartridge water seal defined by the frame 4–5, and sealing elements 7 and 8 arranged inside the frame.

The lower portion of the somewhat Z-shaped flange 16 of the internal part 5 is located externally of the flange 13 of the external frame part 4, with regard to the dry side of the pump assembly. The upper portion of the somewhat Z-shaped flange 16 is located internally of the flange 13 with regard to the dry side of the pump assembly and overlaps the free end of the flange 13.

The inner surface of the tubular portion 14 defines the inner surface 9 of the internal frame part 5 which is engaged by the sealing elements 7 and 8. The external surface of the tubular portion 14 is covered with an elastomeric layer 17, which is vulcanized on the tubular portion 14, and is compressed between the outer surface of the axle 1 and the tubular portion 14. The elastomeric layer 17 also covers the entire outer surface of the flange 16. The elastomeric layer 17 forms, at the free end of the flange 16, hydrodynamic claws 18 for refluence of liquids, powder, etc. The elastomeric layer 17 also functions as a backstop in case the pump assembly has a slack, resulting from wear of pump assembly elements.

The elastomeric element 8 is vulcanized on a metal, substantially an L-shaped support ring having a tubular axially extending portion 20. The tubular portion 19 of the L-shaped support ring is secured at the inner surface of the external frame part. The sealing element 8 is actually vulcanized only on the radial portion 20, which has a shape slightly resembling a Z-shaped profile.

The elastomeric sealing element 8 has at least three sealing lips 21 which engage the inner surface 9 of the internal frame part 5. One of the sealing lips 21, which is located farthest away from the wet side of the pump assembly, is subjected to a biasing force of a garter spring 22 of the type used in oil seals which biases this lip 21 against the inner surface 9.

The elastomeric sealing element 8 has, in a an area adjacent to the upper portion of the flange 20, hydrodynamic claws 23 for sealing against refluence of a lubricant or grease of the seal. The claws 23 also serve as a backstop regulator of the internal displacements when the cartridge seal is mounted in the pump assembly.

The sealing element 7 is formed as a circular crown part, a straight portion of which is secured between an upper portion of the flange 20 and a radial flange 24 of another L-shaped support ring. The tubular axial portion 25 is secured to the inner surface of the external frame part 4. The circular portion of the sealing element 7 extends toward the wet side of the pump assembly, with the end of the circular portion being pressed against the inner surface of the internal frame part 4. The circular portion of the sealing element 7 may be provided with hydrodynamic grooves 26.

The sealing element 7 is formed of PTFE or of high-resistance polyamids. The cartridge seal may be filled with inclusions of a special grease 27. The metal parts of the seal, which are exposed to water, are protected against corrosion. The seal is mounted in the pump assembly as a replaceable cartridge. The above-described cartridge water seal is advantageously, but not exclusively, used in pump assemblies having increased sizes.

I claim:

1. A cartridge water seal for use in an endothermal engine-powered water pump for isolating a dry side of the pump from a wet side of the pump, the pump having a pump body having an inner wall defining a cavity and an axle extending in the cavity, said cartridge water seal comprising:

an annular frame located in an annular space between the axle and the inner wall of the pump body and having an external frame part secured to the inner wall and an internal frame part secured on the axle for joint rotation therewith, said external and internal frame parts having respective inner surfaces defining a cavity therebetween; and first and second sealing elements located in said cavity of said annular frame, said first sealing element being located at the wet side of the pump and being formed of a plastic material, said second sealing element being located at the dry side of the pump and being formed of an elastomeric material, said first and second sailing elements being secured to said external frame part and having sealing surfaces engaging an inner surface of said internal frame part, wherein said external and internal frame parts are formed each as a U-shaped ring having a tubular portion, the tubular portion of said external frame part being secured to the inner wall of the pump body, and the tubular portion of said internal frame part being secured to the axle, and two flanges extending radially at opposite ends of a respective tubular portion, the two flanges of the external frame part extending away from the pump body and the two flanges of the internal frame Dart extending away for the axle, one of each two flanges being associated with the wet side of the pump, and another of said two flanges being associated with the dry side of the pump, said flanges associated with the wet side of the pump radially overlapping each other, and said flanges associated with the dry side of the pump radially overlapping each other;

wherein said first and second sealing elements are located in a space limited by the one flange of said external frame part and the another flange of said internal frame part.

2. A cartridge water seal as set forth in claim 1, wherein an outer surface of the tubular section of said external frame part has an elastomeric layer, vulcanized thereon, and wherein the one and the another flanges of said external frame part have respectively an approximately Z-profile, and a straight profile.

3. A cartridge water seal as set forth in claim 1, further comprising first and second L-shaped rings for securing said first and second sealing elements to said external frame part and arranged in a mirror-image relationship with respect to each other, each of said first and second L-shaped rings having an axial portion secured to the inner surface of said external frame part and a radial portion.

4. A cartridge water seal as set forth in claim 3, wherein said radial portion of said second L-shaped ring has an approximately Z-profile, wherein said first sealing element has a straight portion secured between radial portions of said first and second L-shaped ring and an arcuate portion extending toward the wet section of the pump and having a free end thereof, defining a sealing surface of said first sealing element which sealingly engages the inner surface of said internal frame part, and wherein said arcuate portion has hydrodynamic sealing grooves.

5. A cartridge water seal as set forth in claim 3, wherein said second sealing element is secured to the radial portion of said second L-shaped ring, and has three sealing lips defining sealing surfaces of said second sealing element which sealingly engages the inner surface of said internal frame part.

6. A cartridge water seal as set forth in claim 5, further comprising spring means for biasing a sealing lip, which is farthest away from the wet section of the pump, against the inner surface of said internal frame part.

7. A cartridge water seal as set forth in claim 5, wherein cavities between adjacent sealing lips are filled with grease.

* * * * *